(No Model.)
A. B. BONNEVILLE.
COOLING APPARATUS FOR CALCINED MATERIAL.
No. 455,491. Patented July 7, 1891.
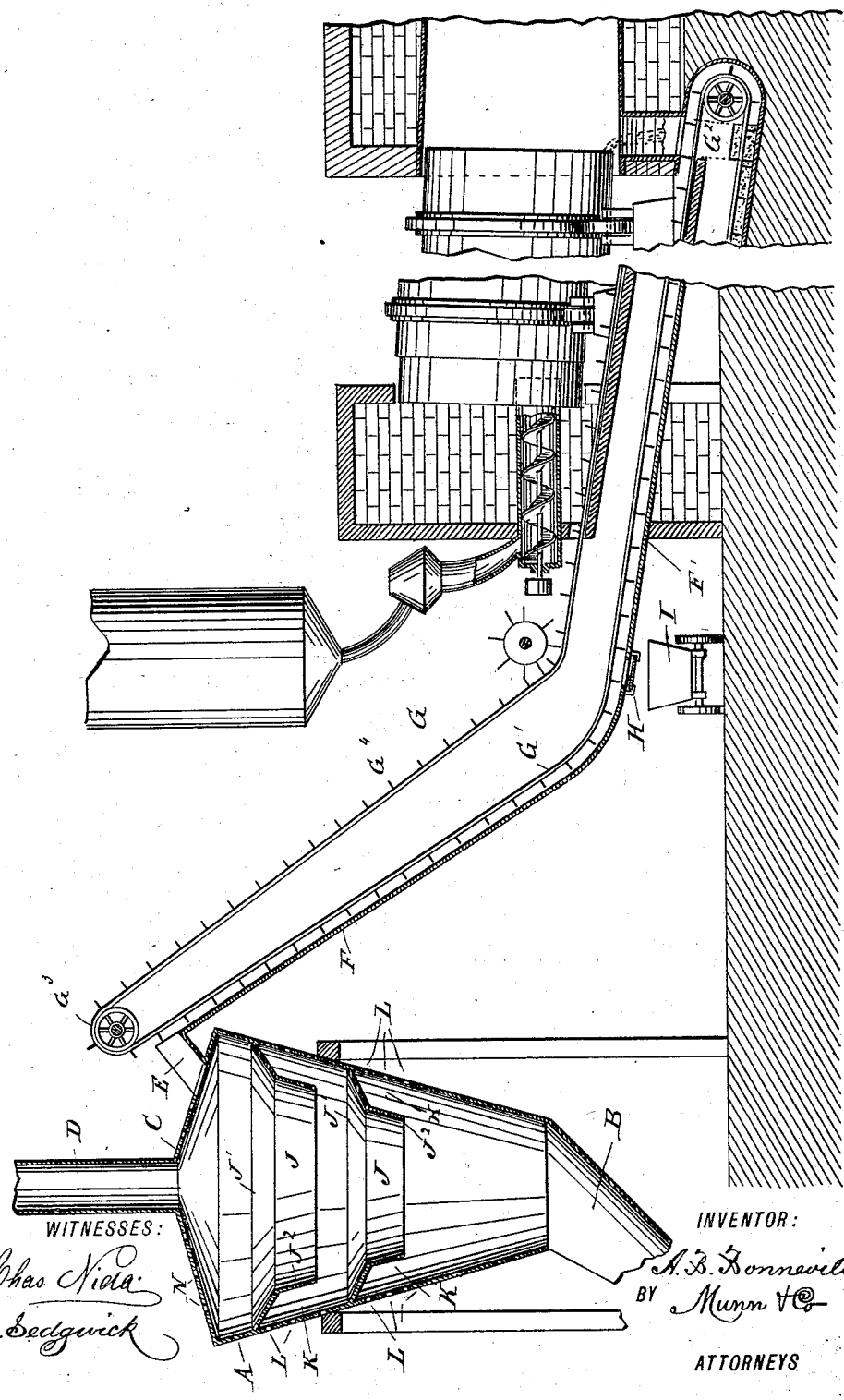

UNITED STATES PATENT OFFICE.

AMABLE B. BONNEVILLE, OF ALLENTOWN, PENNSYLVANIA.

COOLING APPARATUS FOR CALCINED MATERIAL.

SPECIFICATION forming part of Letters Patent No. 455,491, dated July 7, 1891.

Application filed November 21, 1890. Serial No. 372,166. (No model.)

*To all whom it may concern:*

Be it known that I, AMABLE B. BONNEVILLE, of Allentown, in the county of Lehigh and State of Pennsylvania, have invented a new and Improved Cooling Apparatus for Calcined Materials, of which the following is a full, clear, and exact description.

The object of the invention is to provide a new and improved apparatus especially designed for receiving and gradually cooling calcined substances without undue exposure to the action of the atmosphere.

The invention consists of a receptacle connected at the top with a conveyer for carrying the material to the said receptacle, the latter being provided at its inside with a series of hoppers to form air-spaces connected by openings in the wall of the receptacle with the outside.

The invention also consists of certain parts and details and combinations of the same, as will be hereinafter fully described, and then pointed out in the claims.

Reference is to be had to the accompanying drawing, forming a part of this specification, in which the figure is a sectional side elevation of the improvement shown, in connection with the conveyer for which United States Letters Patent No. 438,054 were granted to me October 7, 1890.

The improved cooling apparatus is provided with a receptacle A, made of suitable material, in the form of an inverted truncated cone, as is plainly illustrated in the drawing. The lower smaller end of the receptacle is open and connects with a chute B, from which the material after being cooled in the receptacle A is passed to a crushing or grinding device. The upper end of the receptacle A is closed by a top C, carrying in its middle the vent-stack D, through which the hot air will escape. The top C is also connected with a slightly-inclined chute E, extending to the bottom plate F of a conveyer G, generally of the construction shown in the patent above referred to. The conveyer G is provided with the endless conveyer-belt G', passing over the end pulleys G² and G³ and provided with plates G⁴ to move the calcined material along the lower part F' of the bottom plate F onto the upper and somewhat more inclined extension of said bottom plate, as shown in the drawing.

In the part F' of the bottom plate near its outer end is arranged a gate or valve H, which when open permits the material moved forward by the conveyer-belt to drop out into a barrel or wagon I to be tested as to its quality and condition. If the sample is found to be all right, the valve H is closed and the material is delivered to the chute E and discharged into the upper end of the receptacle A. The latter is provided in its interior with one or more hoppers J, each of which is provided with a flange J', secured at its upper end to the inner wall of the receptacle A and projecting inward and downward, as is plainly shown in the drawing. From this flange J' extends downward a second flange J², concentric with the wall of the receptacle. The hopper J thus forms with the wall of the receptacle A an air-space K, connected by vent-openings L in the wall with the atmosphere. Hot-air outlet-openings N are also formed in the cover C. The hoppers J prevent the material from clogging the vent holes or openings L.

The operation is as follows: The material in a hot state is transported by the conveyer G and discharged through the chute E into the upper end of the receptacle A. The latter is usually filled with the material, the cooled part of which is removed from the bottom by the discharge-chute B to be ground, as previously stated. The material in passing downward in the receptacle A comes in contact with the cool air passing upward through the chute B to the air-space K and out through vent-openings L, so that a gradual cooling of the material takes place on its downward passage. Part of the air passing into the highly-heated material is burned, and the burning gases pass off through the vent-stack D.

The cooling apparatus is more especially designed for use in manufacturing Portland cement. The Portland stone or composition, as is well known, is subjected to a high degree of heat, in order to combine the different ingredients—that is, lime, silicate, and alumina. It is of the greatest importance that atmospheric air be excluded therefrom when in its high heated state as much as possible, as it is injurious to the combining of the said ingrediates, thus forming a poor quality of cement and giving it a bad color. This is due to the action of the air on the oxide of iron contained in the calcined substance and to other causes. The material after burning and as discharged by the conveyer into the receptacle A is in the shape of clinkers, and as the air passes through the clinkers from the bottom upward it gradually cools the said clinkers, so that they are in a fairly cooled state at the time they are removed at the lower end of the receptacle through the chute B. It takes about three days to draw the material from the top to the bottom, therefore insuring a slow and gradual curing and cooling of the clinkers.

Having thus described my invention, what I claim as new, and desire to secure by Letters Patent, is—

1. In a cooling apparatus for calcined materials, the combination, with a conveyer adapted to carry the material, of a receptacle into which the material is discharged by the said conveyer, and a series of hoppers arranged in the said receptacle one above the other, substantially as shown and described.

2. In a cooling apparatus for calcined materials, a receptacle made in the shape of an inverted truncated cone and having air-openings in its wall, and a series of hoppers arranged one above the other in the said receptacle to form air-spaces in communication with the wall-openings, substantially as shown and described.

3. A cooling apparatus for calcined materials, comprising a receptacle made in the shape of an inverted truncated cone open at the bottom, a cover held on the upper end of the said receptacle, and a series of V-shaped hoppers arranged one above the other in the receptacle and forming air-spaces in communication with openings in the wall of the said receptacle, substantially as shown and described.

4. A cooling apparatus for calcined materials, comprising a receptacle made in the shape of an inverted truncated cone open at the bottom, a cover held on the upper end of the said receptacle, a series of V-shaped hoppers arranged one above the other in the receptacle and forming an air-space in communication with openings in the wall of the said receptacle, and an inclosed conveyer adapted to discharge the material through the said cover into the interior of the receptacle, substantially as shown and described.

AMABLE B. BONNEVILLE.

Witnesses:
THEO. G. HOSTER,
C. SEDGWICK.